(12) United States Patent
Laroia et al.

(10) Patent No.: US 6,807,160 B1
(45) Date of Patent: Oct. 19, 2004

(54) TRANSMISSION OF MOBILE REQUESTS IN WIRELESS UPLINK SYSTEM

(75) Inventors: Rajiv Laroia, Basking Ridge, NJ (US); Junyi Li, Matawan, NJ (US); Sathyadev Venkata Uppala, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 848 days.

(21) Appl. No.: 09/596,434

(22) Filed: Jun. 19, 2000

(51) Int. Cl.[7] .................................................. H04Q 7/20
(52) U.S. Cl. ........................................ 370/329; 370/347
(58) Field of Search .............................. 370/329, 330, 370/347, 348, 442, 443

(56) References Cited

U.S. PATENT DOCUMENTS

| | | | |
|---|---|---|---|
| 4,583,217 A | | 4/1986 | Kittel |
| 4,815,073 A | | 3/1989 | Grauel et al. |
| 5,012,469 A | * | 4/1991 | Sardana ....................... 370/322 |
| 5,297,144 A | | 3/1994 | Gilbert et al. |
| 5,577,024 A | | 11/1996 | Jokinen et al. |
| 6,493,334 B1 | * | 12/2002 | Krzymien et al. .......... 370/342 |

FOREIGN PATENT DOCUMENTS

WO      WO 98/18280        4/1998

OTHER PUBLICATIONS

European Search Report, 3pages, Oct. 1, 2001 for Application EP 01 30 5050.

* cited by examiner

*Primary Examiner*—Melvin Marcelo

(57) ABSTRACT

Access request transmissions are effected in a wireless communications system by assigning each mobile unit a unique dedicated uplink resource. Specifically, each mobile unit is assigned channel segments with distinct time slot indices and/or waveform indices, where waveforms with distinct indices are orthogonal. A base station can identify the mobile that has made an access request from the dedicated uplink resource. Therefore, no mobile identification number is needed in the uplink request message. Then, the base station can transmit a request response message on a shared downlink resource that may include the identification number of the requesting mobile unit to acknowledge reception of the request. The mobile unit may transmit on a shared uplink resource an acknowledgment of reception of the downlink request response message.

48 Claims, 4 Drawing Sheets

US 6,807,160 B1

TRANSMISSION OF MOBILE REQUESTS IN WIRELESS UPLINK SYSTEM

RELATED APPLICATION

U.S. patent application Ser. No. 09/596,817, now U.S. Pat. No. 6,708,040 issued Mar. 16, 2004, was filed concurrently herewith.

TECHNICAL FIELD

This invention relates to wireless communications systems and, more particularly, to wireless communications between mobile units and base stations.

BACKGROUND OF THE INVENTION

The basic mechanism in wireless communication systems for a base station and one or more mobile units to communicate is to exchange messages by utilizing a so-called segment. One such wireless system is the Orthogonal Frequency Division Multiplex (OFDM) system. A segment, as shown in FIG. 1, is a combination of a time slot index and a waveform index. A time slot is a basic time unit having a unique time slot index associated with it. During any particular time slot interval there could be several waveforms that are transmitted and received that may or may not be orthogonal. Each waveform has a unique waveform index. Messages of particular interest in wireless communication systems are mobile unit requests on an uplink.

Typically, the same uplink resource is shared by more than one mobile unit to convey access requests to a base station. As shown in FIGS. 2A and 2B, different mobile units may be assigned segments that have the same time slot index, and either the same waveform index or different waveform indices, but the waveforms are not orthogonal. In FIG. 2A one mobile unit, for example #1, is transmitting a request while Ar another mobile unit, for example #2, is not. Consequently, there is no collision between the request from mobile unit #1 with a request from mobile unit #2. However, since requests from the individual mobile units may arrive at a base station randomly, there is a distinct possibility of a collision between requests from mobile unit #1 and mobile unit #2, as shown in FIG. 2B. Consequently, both requests must be re-transmitted resulting in undesirable delay.

Moreover, because there is no power control of the mobile unit during the access request process and because the nature of the request transmissions is random and bursty, the uplink request process is very slow and its reliability is less than desirable.

SUMMARY OF THE INVENTION

Problems and limitations of prior mobile unit and base station access request transmissions are addressed by assigning each mobile unit a unique dedicated uplink resource. Specifically, each mobile unit is assigned segments with distinct time slot indices and/or waveform indices, where waveforms with distinct indices are orthogonal.

A base station can identify the mobile that has made an access request from the dedicated uplink resource. Therefore, no mobile identification number is needed in the uplink request message. Then, the base station can transmit a request response message on a shared downlink resource that may include the identification number of the requesting mobile unit to acknowledge reception of the request.

The mobile unit may transmit on a shared uplink resource an acknowledgment of reception of the downlink request response message.

DETAILED DESCRIPTION

Figure 3:
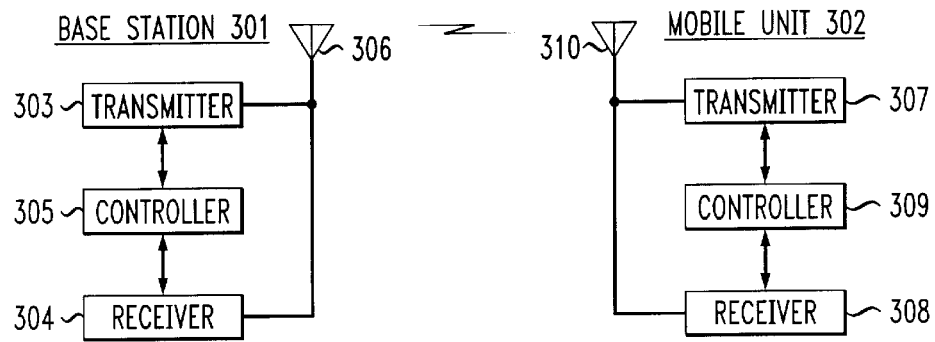
FIG. 3 shows, in simplified block diagram form, details of a base station and a mobile unit in which the invention may be employed.

FIG. 3 shows, in simplified block diagram form, details of a base station and a mobile unit in which the invention may be employed. Specifically, shown are base station 301 and mobile unit 302. It is noted that only a single mobile unit 302 is shown but, typically, a set including a number of mobile units, shares a base station 301. In this example, base station 301 includes transmitter 303, receiver 304 and controller 305 for transmitting and receiving wireless messages via antenna 306. Controller 305 is employed to control operation of transmitter 303 and receiver 304, in accordance with the invention. Similarly, in this example, mobile unit 302 includes transmitter 307, receiver 308 and controller 309 for transmitting and receiving wireless messages via antenna 310. Controller 309 is employed to control operation of transmitter 307 and receiver 308, in accordance with the invention.

Figure 1:
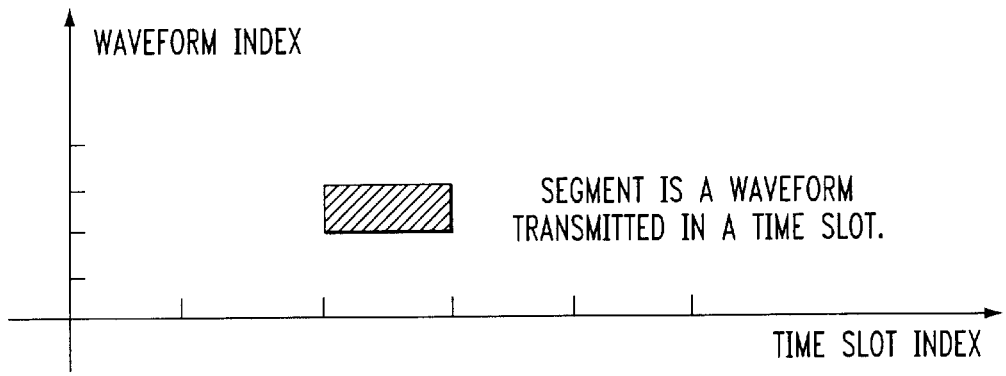
FIG. 1 is a graphical representation of a segment useful in describing the invention.
Figure 2A:
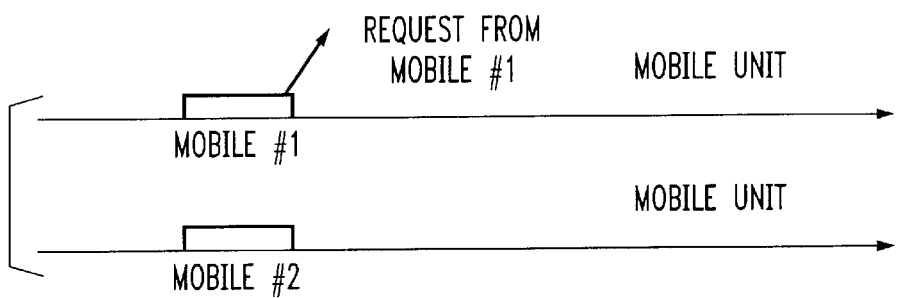
FIGS. 2A and 2B are graphical representations of a prior contention-based transmission of mobile unit requests on an uplink.
Figure 2B:
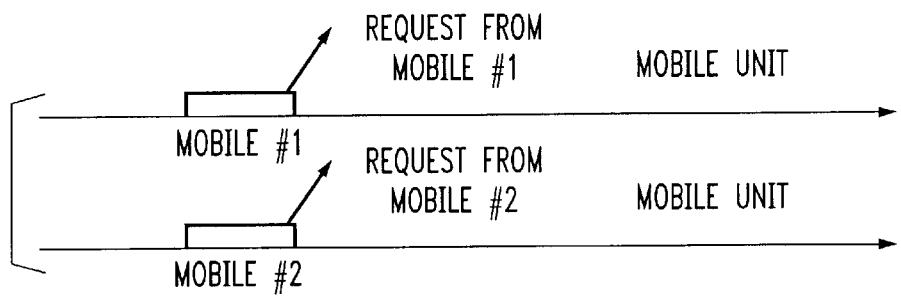
Figure 4A:
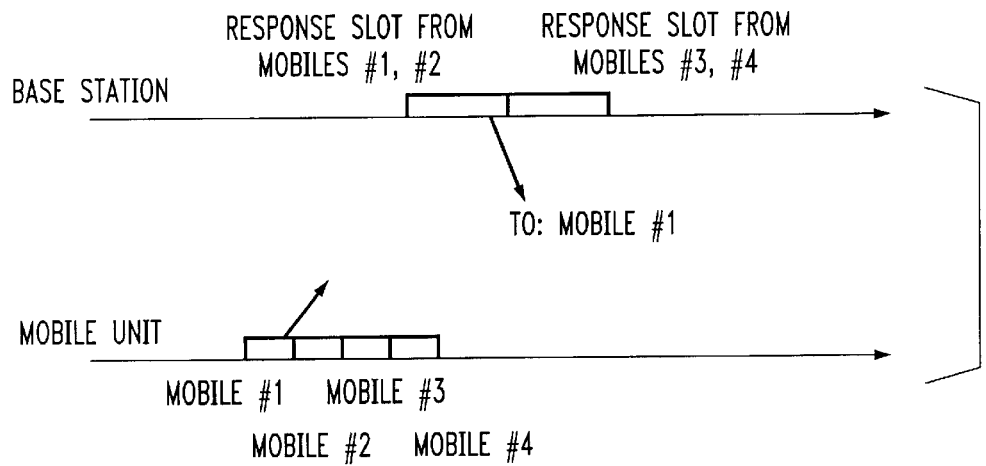
FIGS. 4A and 4B are graphical representations of a contention-free transmission of mobile unit requests on an uplink and including a shared downlink resource for transmitting request response messages useful in describing the invention.
Figure 4B:
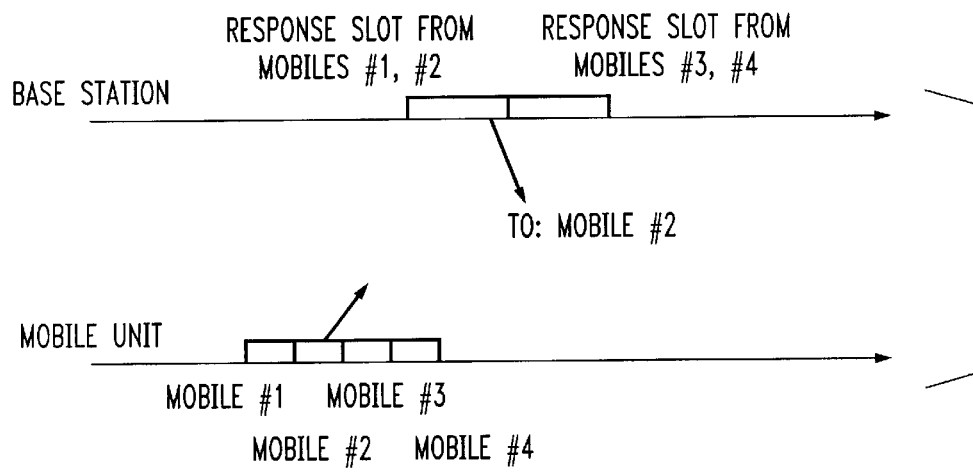

FIGS. 4A and 4B are graphical representations of a contention-free transmission of mobile unit requests on an uplink and including a shared downlink resource for transmitting request response messages useful in describing the invention. Specifically, to eliminate the problem of collision between mobile unit requests on the uplink resource, each mobile unit is assigned a dedicated uplink resource. The dedicated uplink resource is not shared with any other mobile unit. To this end, each mobile unit is assigned segments, as shown in FIG. 1, with distinct time slot indices and/or waveform indices, where waveforms with distinct indices are orthogonal. As shown in FIGS. 4A and 4B, this is realized by assigning mobile unit #1 and mobile unit #2 two different time slots.

After receiving a mobile request, base station 301 can identify which mobile 302 has transmitted the request. This is realized by employing the dedicated uplink resource assigned to the mobile unit 302 that transmitted the request on the uplink. Then, base station 301 can transmit a request response message on a downlink, which may include the identification of the mobile unit 302 that transmitted the request on the uplink in order to acknowledge the request. It is noted that the downlink resource for transmitting the request response messages is not dedicated to any particular mobile unit or units, but is a shared resource for all mobile units sharing base station 301. It is also important to note that segments for transmitting downlink request response messages from base station 301 do not necessarily have a one-to-one mapping to dedicated segments for transmitting uplink requests from mobile unit 302. As shown in FIG. 4A, after receiving a request from mobile unit #1, base station 301 transmits back a request response message in a downlink segment. In another instance, as shown in FIG. 4B, after receiving a request message from mobile unit #2, base station 301 transmits back a request response message in the same downlink segment as the request response message transmitted to mobile unit #1.

Figure 5:
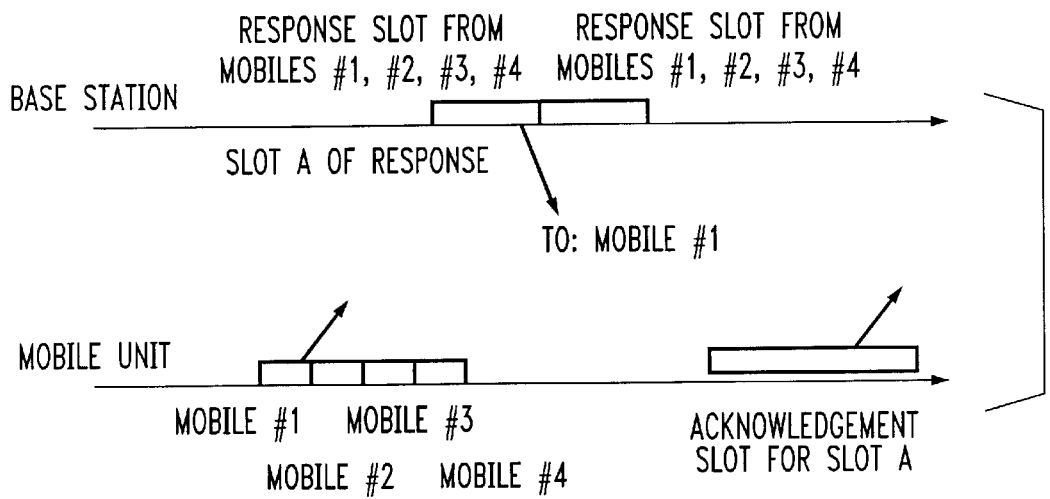
FIG. 5 is a graphical representation of the transmission of acknowledgments for downlink request response messages on a shared uplink resource useful in describing an aspect of the invention.

FIG. 5 is a graphical representation of the transmission of acknowledgments for downlink request response messages on a shared uplink resource useful in describing an aspect of the invention. For a given amount of the total uplink resource, the amount of a dedicated resource for an individual mobile unit is generally smaller than what may be available in the prior contention-based implementation. As a result, dedicated mobile unit request transmission may not be reliable in a wireless channel. In particular, if an uplink mobile unit request is not received by base station 301, the mobile unit request must be re-transmitted, which is very similar to the collision situation in the contention-based implementation. On the other hand, the error of false alarm, where base station 301 perceives receiving some mobile unit request that has not really been transmitted, also causes wasted use of the system resource.

In order to improve reliability without introducing any significant amount of resource overhead, additional acknowledgment segments are added on the uplink for each downlink request response message. As shown in FIG. 5, an uplink acknowledgment segment is slaved to a downlink request response segment. Therefore, acknowledgment segments are not dedicated for any particular mobile units, but shared by all mobile units. Whichever mobile unit transmits a request in its dedicated uplink segment and detects its own identification number in one of the request response message segments transmits an acknowledgment in the corresponding acknowledgment segment. Thus, each segment on the shared uplink resource has a one-to-one correspondence to a response message. Clearly, although acknowledgment segments are shared, no collision occurs unless two mobile units transmit their requests and both detect their identification numbers in the same request response message segment. In such an instance, at least one of the mobile units must have decoded the request response message in-error. The advantage of employing a shared resource for transmitting acknowledgments is that acknowledgment segments can be made to contain sufficient energy to ensure needed reliability without causing any significant system resource overhead.

Figure 6:
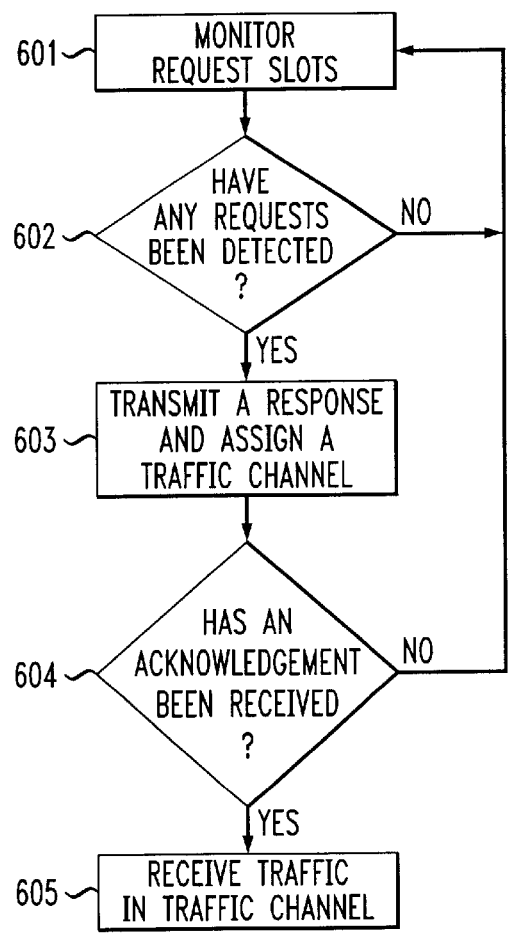
FIG. 6 is a flowchart illustrating the steps in a process employed in a base station to detect reception of mobile unit requests and transmit downlink request response messages.

FIG. 6 is a flowchart illustrating the steps in a process employed in base station 301 to detect reception of mobile unit requests and transmit request response messages. Thus, step 601 causes base station 301 to monitor mobile unit request time slots. Step 602 tests to determine if any mobile unit requests have been detected. If the test result in step 602 is No, control is returned to step 601 and steps 601 and 602 are iterated until step 602 yields a YES result. The YES result in step 602 indicates the detection of a mobile unit request in a dedicated uplink resource. Thereafter, step 603 causes the transmission of a request response message on the downlink. It is noted that the request response message may include the identification number of the mobile unit that transmitted the request. Step 603 also causes a traffic channel to be assigned to the requesting mobile unit. Then, step 604 tests to determine if an acknowledgment has been received from the mobile unit that the request response message was directed to. If the test result in step 604 is NO, the assigned traffic channel is retracted by base station 301, and control is returned to step 601 and steps 601 through 604 are iterated until step 604 yields a YES result. A YES result in step 604 indicates that an acknowledgment has been received from the mobile unit that a request response message was transmitted toward. Step 605 causes base station 301 to receive data traffic in the assigned traffic channel from the requesting mobile unit, for example mobile unit 302.

Figure 7:
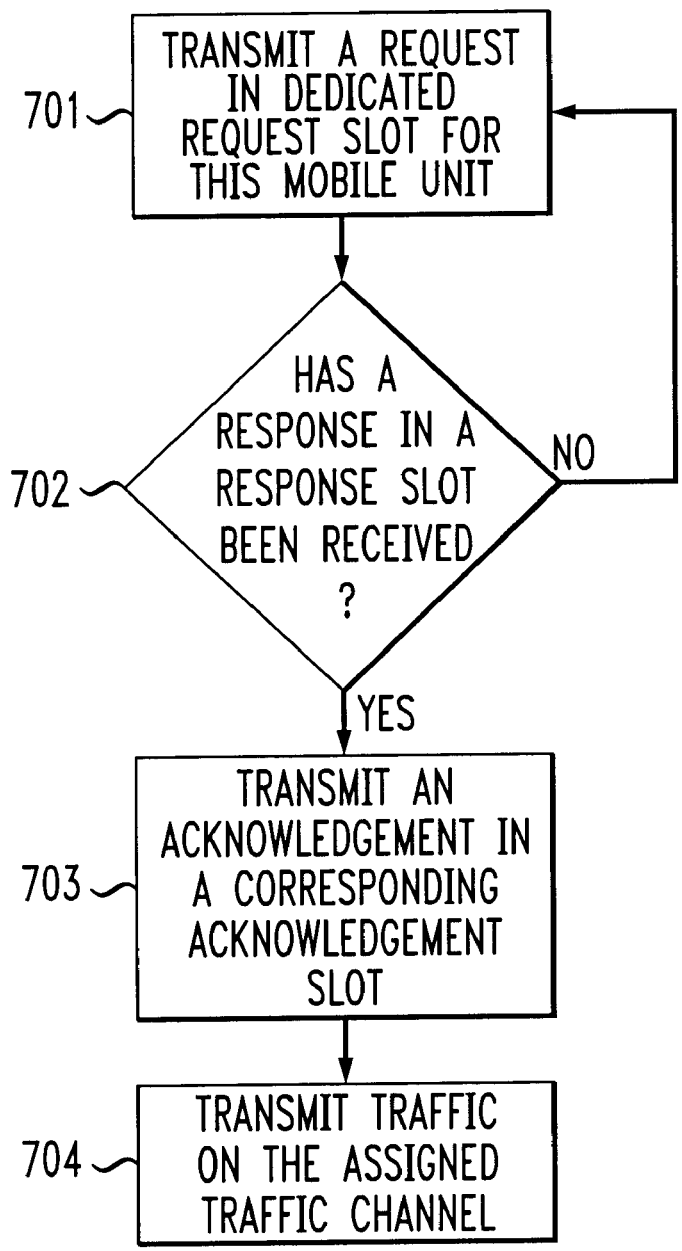
FIG. 7 is a flowchart illustrating steps in a process employed in a mobile unit to transmit requests, receive request response messages and transmit acknowledgments in accordance with the invention.

FIG. 7 is a flowchart illustrating steps in a process employed in a mobile unit to transmit requests, receive request response messages and transmit acknowledgments in accordance with the invention. Step 701 causes a mobile unit, for example mobile unit 302, to transmit on the uplink a request in its dedicated time slot to a base station, for example base station 301. Then, step 702 tests to determine if a request response message from base station 301 has been received in a shared request response message downlink resource, namely, a downlink time slot. If the test result in step 702 is NO, control is returned to step 701 and steps 701 and 702 are iterated until step 702 yields a YES result. That is, a request response message has been received in the shared downlink request response message time slot indicating that base station 301 has received the request from this mobile unit, i.e., mobile unit 302. Thereafter, step 703 causes mobile unit 302 to transmit an acknowledgment of receiving the request response message in a shared acknowledgment time slot. Then, step 704 causes mobile unit 302 to transmit data traffic on the traffic channel assigned to it by base station 301.

The above-described embodiments are, of course, merely illustrative of the principles of the invention. Indeed, numerous other methods or apparatus may be devised by those skilled in the art without departing from the spirit and scope of the invention.

What is claimed is:

1. A method for use in a wireless communications mobile unit comprising the steps of:

transmitting an access request message on a wireless uplink to a base station on a uplink resource dedicated to a particular mobile unit, wherein no identification of the particular mobile unit need be transmitted to said base station;

detecting a received request response message on a wireless downlink from said base station on a downlink resource shared with other mobile units; and transmitting an acknowledgment message indicative of reception of said request response message to said base station on a shared uplink acknowledgment resource having a one-to-one correspondence, i.e., slaved, to said shared downlink response resource on which said response message was received, whereby latency is reduced and reliability is improved.

2. The method as defined in claim 1 wherein said prescribed uplink resource is a segment.

3. The method as defined in claim 2 wherein said segment includes distinct time slot indices and/or waveform indices, where waveforms with distinct indices are orthogonal.

4. The method as defined in claim 1 wherein said shared downlink resource includes at least one response time slot.

5. The method as defined in claim 1 wherein said shared uplink resource includes at least one segment.

6. The method as defined in claim 5 wherein said shared uplink resource includes a number of segments based on a prescribed relationship to the number of response messages.

7. The method as defined in claim 6 wherein said number of segments is equal to said number of response messages and each of said segments has a one-to-one correspondence to a response message.

8. A method for use in a wireless communications mobile unit comprising the steps of:

transmitting an access request message on a resource dedicated to a mobile unit to a base station;

detecting a request response message received from said base station on a prescribed downlink resource; and transmitting an acknowledgment message indicative of reception of said request response message on a prescribed shared uplink resource to said base station, wherein said shared downlink resource includes a number of time slots based on a number of mobile units that are sharing said shared downlink resource, whereby latency is reduced and reliability is improved.

9. The method as defined in claim 8 wherein the number of time slots is less than the number of mobile units.

10. A method for use in a wireless communications base station comprising the steps of:

monitoring received request time slots to detect an incoming request from one or more mobile units on time slots, each of said time slots dedicated on a one-to-one basis to said one or more mobile units;

determining whether any requests have been received;

if at least one request has been received, transmitting a request response message on a shared downlink resource to said one or more requesting mobile units corresponding to said at least one request; and determining whether an acknowledgment message has been received on a shared unlink acknowledgment resource having a one-to-one correspondence i.e., slaved, to said downlink response resource on which said response message was transmitted indicating that said intended mobile unit has received said response message, whereby latency is reduced and reliability is improved.

11. The method as defined in claim 10 wherein said shared downlink resource includes at least one response time slot.

12. The method as defined in claim 10 wherein said shared uplink resource includes at least one segment.

13. The method as defined in claim 12 wherein said shared uplink resource includes a number of segments based on a prescribed relationship to the number of response messages.

14. A method for use in a wireless communications base station comprising the steps of:

monitoring received request time slots to detect an incoming request from at least one mobile unit on time slot dedicated to said at least one mobile unit;

determining whether any requests have been received;

if at least one request has been received, transmitting a request response message on a shared downlink resource to an intended one of one or more requesting mobile units, said shared downlink resource including a number of time slots based on a number of mobile units that are sharing said shared downlink resource; and determining whether an acknowledgment message has been received indicating that said intended mobile unit has received said response message;

whereby latency is reduced and reliability is improved.

15. A method for use in a wireless communications system including one or more base stations and one or more mobile units comprising the steps of:

in a particular mobile unit, transmitting an access request message on a resource dedicated to said particular mobile unit to a base station, wherein no identification of the particular mobile unit need be transmitted, detecting a request response message received from said base station on a prescribed downlink resource shared with others of said one or more mobile units, and transmitting an acknowledgment message indicative of reception of said request response message on a prescribed shared uplink resource to said base station, wherein said prescribed shared uplink resource has a one-to-one correspondence, i.e., is slaved, to said prescribed shared downlink resource; and in a base station, monitoring received request time slots to detect an incoming request from one or more mobile units on time slots, each of said time slots dedicated on a one-to-one basis to said one or more mobile units, determining whether any requests have been received, if at least one request has been received, transmitting a request response message on a shared downlink resource to an intended one of one or more requesting mobile units corresponding to said at least one request, determining whether an acknowledgment message has been received on a shared uplink acknowledgment resource having a one-to-one correspondence, i.e., being slaved, to said downlink response resource on which said response message was transmitted indicating that said intended one mobile unit has received said response messages, and wherein said prescribed shared uplink resource has a one-to-one correspondence, i.e., is slaved, to said prescribed shared downlink resource, whereby latency is reduced and reliability is improved.

16. The method as defined in claim 15 wherein said request time slots are dedicated on a one-to-one basis to mobile units.

17. The method as defined in claim 15 wherein said step of transmitting said response message includes a step of transmitting said response message on a prescribed shared downlink resource.

18. The method as defined in claim 15 wherein said prescribed shared downlink resource includes at least one response time slot.

19. The method as defined in claim 18 wherein said prescribed shared downlink resource includes a number of time slots based on a number of mobile units that are sharing said prescribed shared downlink resource.

20. The method as defined in claim 19 wherein the number of time slots is less than the number of mobile units.

21. The method as defined in claim 15 wherein said prescribed shared uplink resource includes at least one segment.

22. The method as defined in claim 21 wherein said prescribed shared uplink resource includes a number of segments based on a prescribed relationship to the number of response messages.

23. The method as defined in claim 22 wherein said number of segments is equal to said number of response messages and each of said segments has a one-to-one correspondence to a response message.

24. Apparatus for use in a wireless communications mobile unit comprising:
 a controllable transmitter for transmitting an access request message on a wireless uplink to a base station on a uplink resource dedicated to a particular mobile unit, wherein no identification of the particular mobile unit need be transmitted to said base station;
 a controllable receiver for detecting a received request response message on a wireless downlink from said base station on a downlink resource shared with other mobile units; and
 wherein said transmitter transmits an acknowledgment message indicative of reception of said request response message to said base station on a shared uplink acknowledgment resource having a one-to-one correspondence, i.e., slaved to said shared downlink response resource on which said response message was received,
 whereby latency is reduced and reliability is improved.

25. The apparatus as defined in claim 24 wherein said prescribed uplink resource is a segment.

26. The apparatus as defined in claim 25 wherein said segment includes distinct time slot indices and/or waveform indices, where waveforms with distinct indices are orthogonal.

27. The apparatus as defined in claim 24 wherein said prescribed shared downlink resource includes at least one response time slot.

28. The apparatus as defined in claim 27 wherein said prescribed shared downlink resource includes a number of time slots based on a number of mobile units that are sharing said shared downlink resource.

29. The apparatus as defined in claim 28 wherein said number of time slots is less than said number of mobile units.

30. The apparatus as defined in claim 24 wherein said prescribed shared uplink resource includes at least one segment.

31. The apparatus as defined in claim 30 wherein said prescribed shared uplink resource includes a number of segments based on a prescribed relationship to the number of response messages.

32. The apparatus as defined in claim 31 wherein said number of segments is equal to said number of response messages and each of said segments has a one-to-one correspondence to a response message.

33. Apparatus for use in a wireless communications base station comprising:
 a controllable receiver for monitoring received request time slots to detect an incoming request from one or more mobile units on time slots, dedicated on a one-to-one basis to said one or more mobile units;
 a controller for determining whether any requests have been received;
 a controllable transmitter, responsive to a determination that at least one request has been received, for transmitting a request response message on a shared downlink resource to said one or more requesting mobile units corresponding to said at least one request; and
 said controller determining whether an acknowledgment message has been received on a shared uplink acknowledgment resource having a one-to-one correspondence, i.e., slaved, to said downlink response resource on which said response message was transmitted indicating that said intended mobile unit has received said response message on a shared uplink acknowledgment resource having a one-to-one correspondence, i.e., slaved, to said downlink response resource on which said response message was transmitted,
 whereby latency is reduced and reliability is improved.

34. The apparatus as defined in claim 33 wherein said shared downlink resource includes at least one response time slot.

35. The apparatus as defined in claim 34 wherein said shared downlink resource includes a number of time slots based on a number of mobile units that are sharing said shared downlink resource.

36. The apparatus as defined in claim 35 wherein said number of time slots is less than said number of mobile units.

37. The apparatus as defined in claim 33 wherein said shared uplink resource includes at least one segment.

38. The apparatus as defined in claim 37 wherein said shared uplink resource includes a number of segments based on a prescribed relationship to the number of response messages.

39. The apparatus as defined in claim 38 wherein said number of segments is equal to said number of response messages and each of said segments has a one-to-one correspondence to a response message.

40. Apparatus for use in a wireless communications system including one or more base stations and one or more mobile units comprising:

in a particular mobile unit, a controllable transmitter for transmitting an access request message to a base station on a resource dedicated to said particular mobile unit, wherein no identification of the particular mobile unit need be transmitted, a controllable receiver for detecting a request response message received from said base station on a prescribed downlink resource shared with others of said one or more mobile units, and wherein said transmitter transmits an acknowledgment message indicative of reception of said request response message on a prescribed shared uplink resource to said base station; and in a base station, a controllable receiver for monitoring received request time slots to detect an incoming request from one or more mobile units on time slots, each of said time slots dedicated on a one-to-one basis to said one or more mobile units, a controller for determining whether any requests have been received;

a controllable transmitter responsive to a determination that at least one request has been received, for transmitting a request response message on a shared downlink resource to an intended one of one or more requesting mobile units corresponding to said at least one request, and said controller determining whether an acknowledgment message has been received on a shared uplink acknowledgment resource having a one-to-one correspondence i.e., being slaved, to said downlink response resource on which said response message was transmitted indicating that said intended one mobile unit has received said response message, wherein said prescribed shared uplink resource has a one-to-one correspondence, i.e., is slaved, to said prescribed shared downlink resource, whereby latency is reduced and reliability is improved.

41. The apparatus as defined in claim 40 wherein said prescribed uplink resource is a segment.

42. The apparatus as defined in claim 41 wherein said segment includes distinct time slot indices and/or waveform indices, where waveforms with distinct indices are orthogonal.

43. The apparatus as defined in claim 40 wherein said prescribed shared downlink resource includes at least one response time slot.

44. The apparatus as defined in claim 43 wherein said prescribed shared downlink resource includes a number of time slots based on a number of mobile units that are sharing said shared downlink resource.

45. The apparatus as defined in claim 44 wherein said number of time slots is less than said number of mobile units.

46. The apparatus as defined in claim 40 wherein said prescribed shared uplink resource includes at least one segment.

47. The apparatus as defined in claim 46 wherein said prescribed shared uplink resource includes a number of segments dependent on a prescribed relationship to the number of response messages.

48. The apparatus as defined in claim 47 wherein said number of segments is equal to said number of response messages and each of said segments has a one-to-one correspondence to a response message.

* * * * *